(12) United States Patent
Inui

(10) Patent No.: US 7,453,437 B2
(45) Date of Patent: Nov. 18, 2008

(54) ELECTRONIC APPARATUS

(75) Inventor: Fuyuki Inui, Asaka (JP)

(73) Assignee: Fujifilm Corporation, Tokyo (JP)

( * ) Notice: Subject to any disclaimer, the term of this patent is extended or adjusted under 35 U.S.C. 154(b) by 516 days.

(21) Appl. No.: 10/986,853

(22) Filed: Nov. 15, 2004

(65) Prior Publication Data

US 2005/0104866 A1 May 19, 2005

(30) Foreign Application Priority Data

Nov. 19, 2003 (JP) .............................. 2003-389085

(51) Int. Cl.
*G09G 5/00* (2006.01)
(52) U.S. Cl. .................. 345/156; 345/184; 345/901
(58) Field of Classification Search ................ 345/156, 345/184, 901; 178/18.01
See application file for complete search history.

(56) References Cited

U.S. PATENT DOCUMENTS 5,745,716 A * 4/1998 Tchao et al. ................ 715/777
6,064,855 A * 5/2000 Ho ............................. 434/317
6,335,678 B1   1/2002 Heutschi

FOREIGN PATENT DOCUMENTS

| JP | 11-502950 A | 3/1999 |
|---|---|---|
| JP | 2001-525096 A | 12/2001 |
| JP | 2002-108254 A | 4/2002 |
| JP | 2003-76354 A | 3/2003 |
| JP | 2003-140574 A | 5/2003 |
| WO | WO 97/04398 A2 | 2/1997 |

* cited by examiner

*Primary Examiner*—My-Chau T Tran
(74) *Attorney, Agent, or Firm*—Sughrue Mion, PLLC

(57) ABSTRACT

In the electronic apparatus according to the present invention, two display units differ in size are coupled so that an edge part of one of the display units is exposed from the other display unit when the electronic apparatus is folded. An index unit is installed on the edge part and displays index tabs of data recorded in the electronic apparatus. When a user opens the folded electronic apparatus while pressing one of the index tabs, data corresponding to the designated index are extracted from the recorded data and are displayed on the display units.

4 Claims, 6 Drawing Sheets

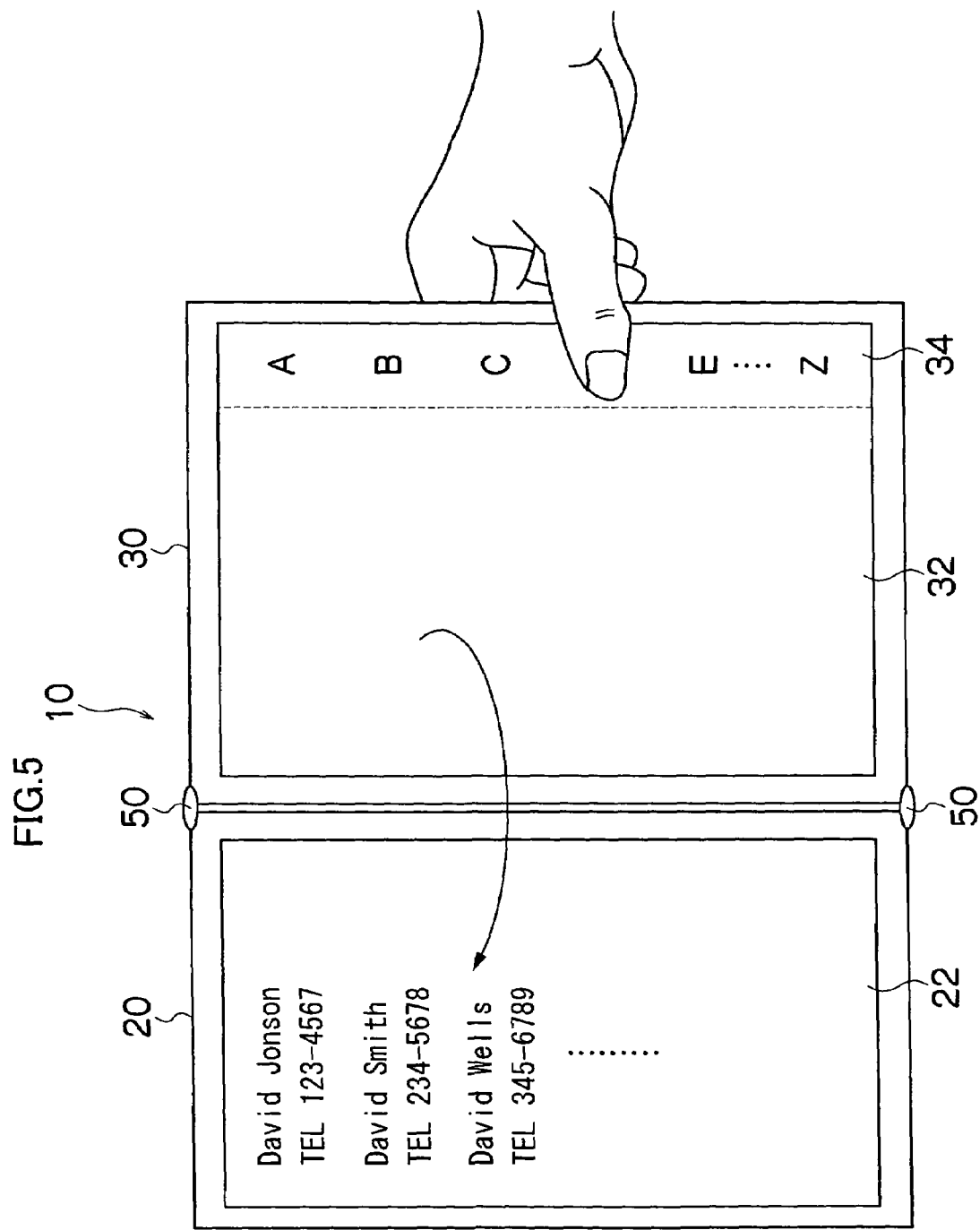

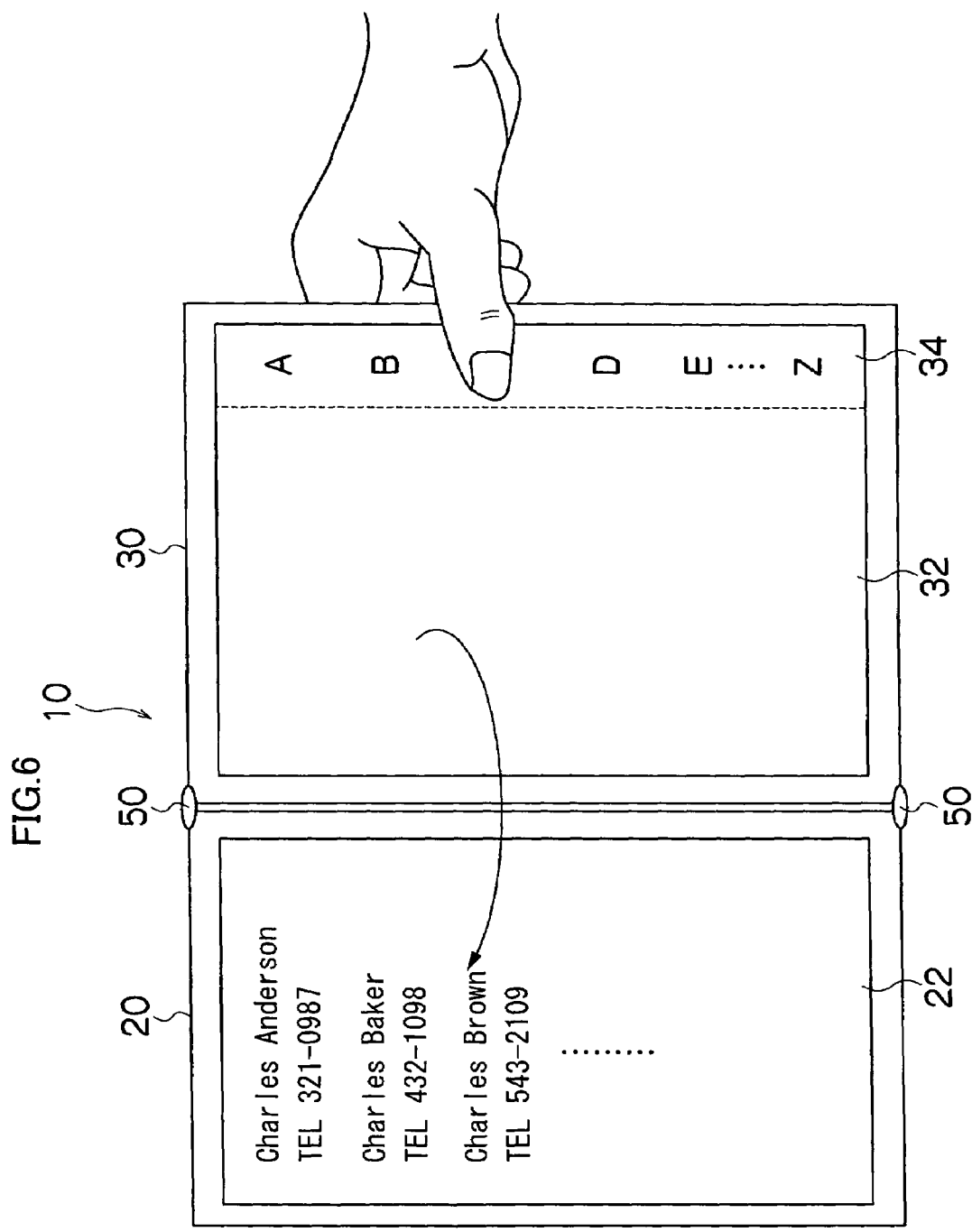

ELECTRONIC APPARATUS

BACKGROUND OF THE INVENTION

1. Field of the Invention

The present invention relates to an electronic apparatus which displays text, images, etc. on a monitor. More particularly, it relates to an electronic apparatus which has an index function.

2. Description of the Related Art

Known electronic apparatus which display text, images, etc. on a monitor include electronic paper type, electronic book type, and electronic addressing type apparatus (see, for example, Japanese Patent Application Publication Nos. 2003-140574, 2003-076354, and 2002-108254; and Japanese Publication of International Patent Application Nos. 2001-525096 and 11-502950).

In spite of recent increases in the capacity of recording media used for such electronic apparatus, electronic apparatus often cannot display a series of data at once due to a limited display area. To deal with this situation, such electronic apparatus are designed to display part of data at once and display a series of data by switching screens one after another.

To switch screens, the user should operate scroll bars or cursor keys on the monitor, rotate the electronic apparatus itself, or the like.

SUMMARY OF THE INVENTION

However, with conventional electronic apparatus such as those described above, the user must perform such special operations that are not performed usually or perform similar operations repeatedly, spending time and effort to refer to necessary data.

The present invention has been made in view of the above circumstances and has an object to provide an electronic apparatus which allows the user to refer to necessary data quickly and easily.

To achieve the above object, the first aspect of the present invention provides an electronic apparatus which is foldable, comprising: a recording unit which contains recorded data; a first equipment unit; a second equipment unit which does not cover the first equipment unit completely when the electronic apparatus is folded; a display unit which is installed on at least one of the first equipment unit and the second equipment unit and displays the recorded data; and a folding unit which foldably couples the first equipment unit and the second equipment unit with the display unit facing inward, an index unit which is installed on an end of the first equipment unit or the second equipment unit, is exposed from the first equipment unit or the second equipment unit when the electronic apparatus is folded, and displays index tabs of the recorded data; a sensor device which senses an index tab specified by a user out of the displayed index tabs when the electronic apparatus remains folded; a extraction device which extracts data corresponding to the sensed index tab out of the recorded data; and a display device which displays the extracted data on the display unit when the electronic apparatus is unfolded.

The electronic apparatus according to the first aspect of the present invention displays index tabs when it remains folded, and thereby allows the user to refer to necessary data quickly and easily by unfolding the electronic apparatus with an index tab specified.

To achieve the above object, the second aspect of the present invention provides an electronic apparatus, comprising: a recording unit which contains recorded data; a first display unit which displays the recorded data; a second display unit which displays the recorded data and is larger than the first display unit; and a folding unit which foldably couples the first display unit and the second display unit with the display unit facing inward, an index unit which is installed on an end of the second display unit and is exposed from the first display unit when the electronic apparatus is folded, and displays index tabs of the recorded data; a sensor device which senses an index tab specified by a user out of the displayed index tabs when the electronic apparatus remains folded; a extraction device which extracts data corresponding to the sensed index tab out of the recorded data; and a display device which displays the extracted data on the first and the second display unit when the electronic apparatus is unfolded.

The electronic apparatus according to the second aspect of the present invention displays index tabs when it remains folded, and thereby allows the user to refer to necessary data quickly and easily by unfolding the electronic apparatus with an index tab specified.

The third aspect of the present invention provides the electronic apparatus set forth in the second aspect of the present invention, wherein the index unit has a tactile sensing function and allows the user to specify any of displayed index tabs by touching the given index tab.

The electronic apparatus according to the third aspect of the present invention allows the user refer to necessary data even more quickly and easily.

The electronic apparatus according to the present invention allows the user to refer to necessary data quickly and easily.

BRIEF DESCRIPTION OF THE DRAWINGS

FIG. 5 is a diagram showing an example of how to operate the electronic book according to the embodiment of the present invention; and FIG. 6 is a diagram showing another example of how to operate the electronic book according to the embodiment of the present invention.

DETAILED DESCRIPTION OF THE PREFERRED EMBODIMENTS

A preferred embodiment of an electronic apparatus according to the present invention will be described with reference to the accompanying drawings.

Figure 1:
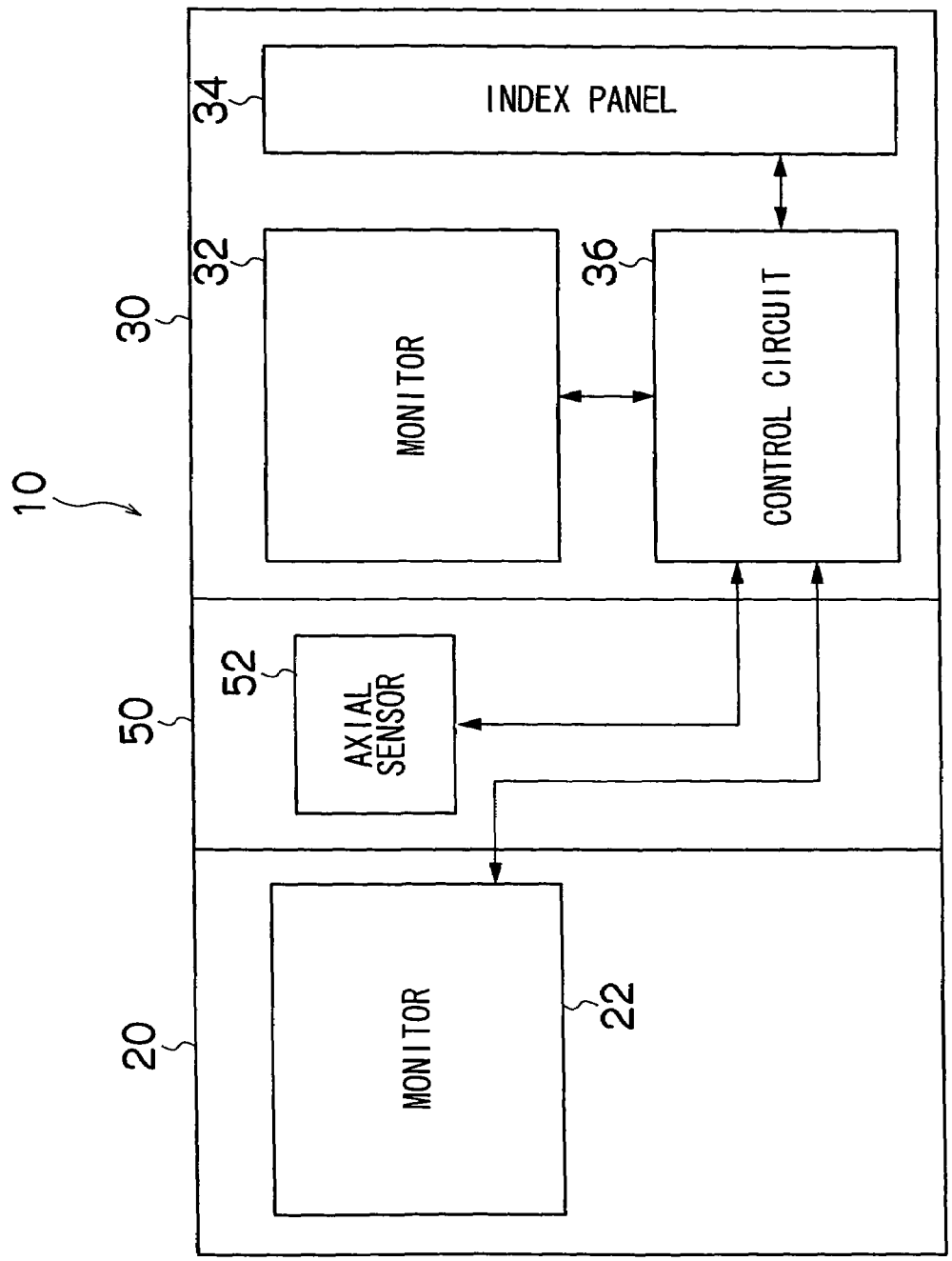
FIG. 1 is a block diagram showing a configuration of an electronic apparatus according to an embodiment of the present invention.

FIG. 1 shows a block diagram of an electronic book 10 according to a preferred embodiment of the present invention. The electronic book 10 comprises a first monitor unit 20 which has a monitor 22, a second monitor unit 30 which has a monitor 32, and an axial unit 50 which makes the monitors foldable. The electronic book 10 is folded with the monitor 22 and monitor 32 facing inward.

The second monitor unit 30 is larger than the first monitor unit 20, so that its end is exposed when the electronic book 10 is folded. The exposed part is equipped with a tactile (touch-panel type) index panel 34, allowing the user to operate index tabs. The second monitor unit 30 is also equipped with a control circuit 36.

Figure 2:
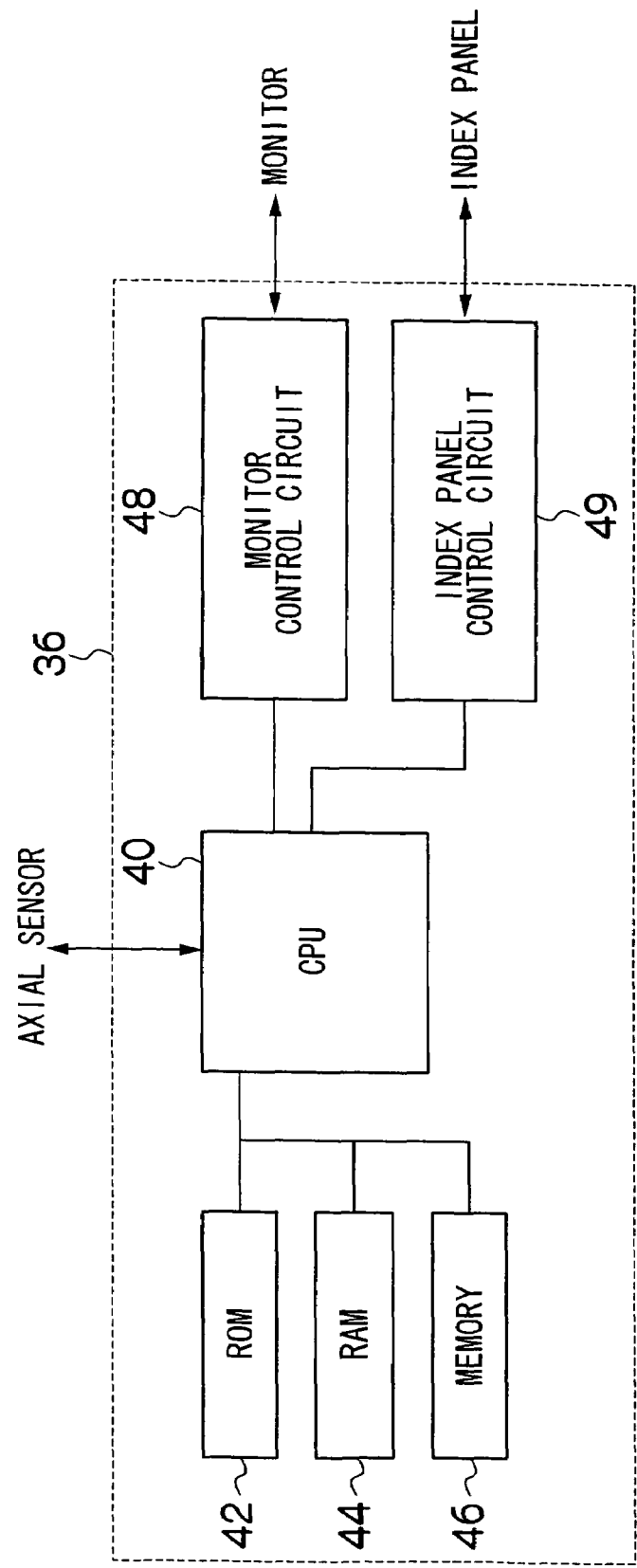
FIG. 2 is a block diagram showing a configuration of a control circuit according to the embodiment of the present invention.

As shown in FIG. 2, the control circuit 36 is equipped with a CPU 40, which performs various processes by controlling various components described below. A ROM 42 stores programs and data for processing and a RAM 44 is used as a temporary storage area during processing. A memory 46 comprises devices such as EEPROM (Electrically Erasable and Programmable Read Only Memory) or other memory cards and stores text data, image data, etc. The electronic book 10 can be used for phone directory, electronic dictionary, electronic album, and various other applications by adding and editing the contents of the memory 46.

The control circuit 36 is also equipped with a monitor control circuit 48 and index panel control circuit 49. The monitor control circuit 48 controls display of the monitor 22 and monitor 32 while the index panel control circuit 49 controls display of the index panel 34 (switches the display according to the usage of the electronic book 10) and senses the index tab pressed by the user on the index panel 34. When the index panel control circuit 49 senses the index tab, data corresponding to the index tab is extracted from the memory 46.

Incidentally, the axial unit 50 is equipped with an axial sensor 52 to detect fold status (open or closed) of the electronic book 10.

Next, a usage type of the electronic book 10 will be described. Here description will be given of a case in which the electronic book 10 is used as a phone directory.

Figure 3:
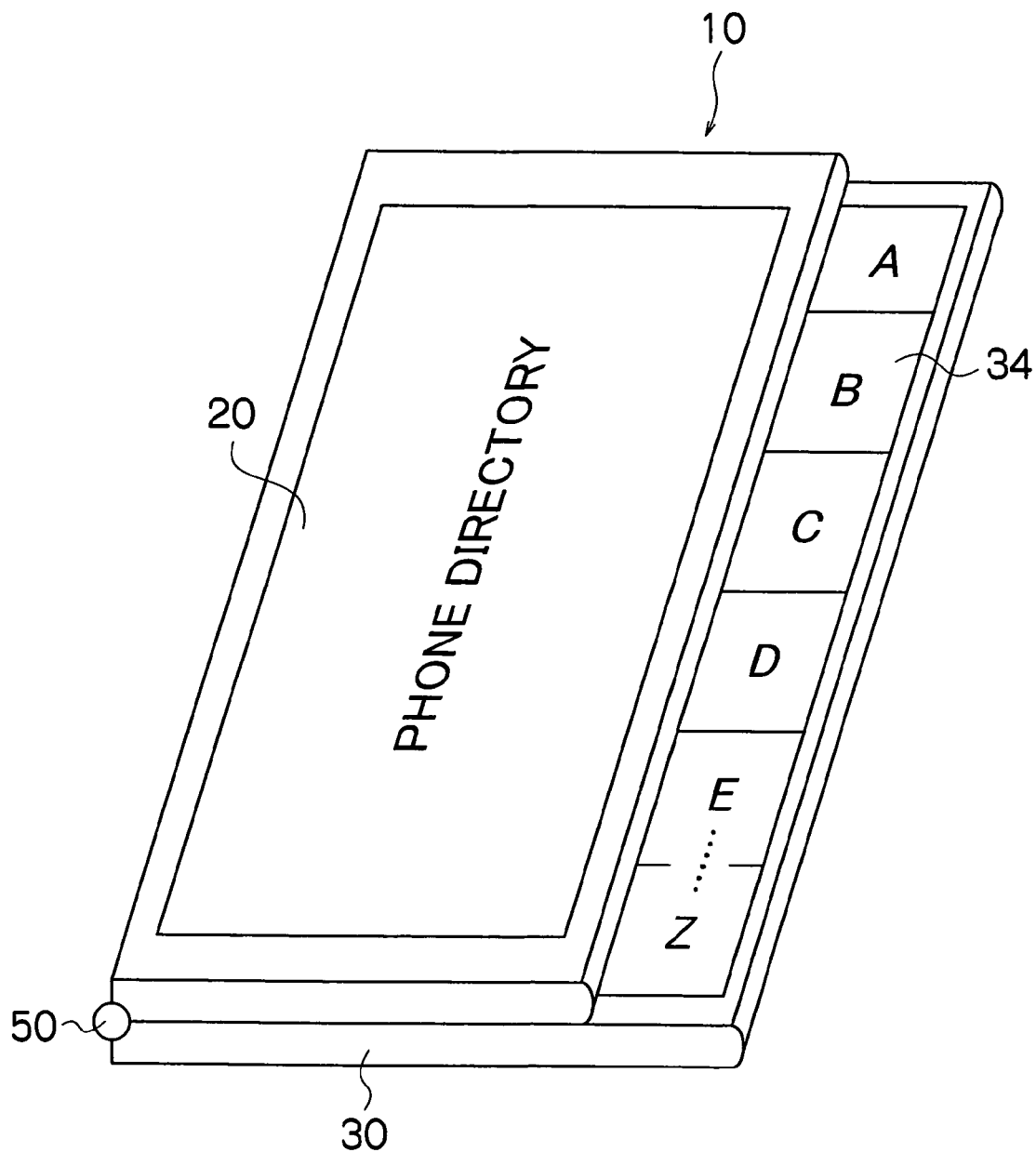
FIG. 3 is a diagram showing an electronic book in a closed state, according to the embodiment of the present invention.
Figure 4:
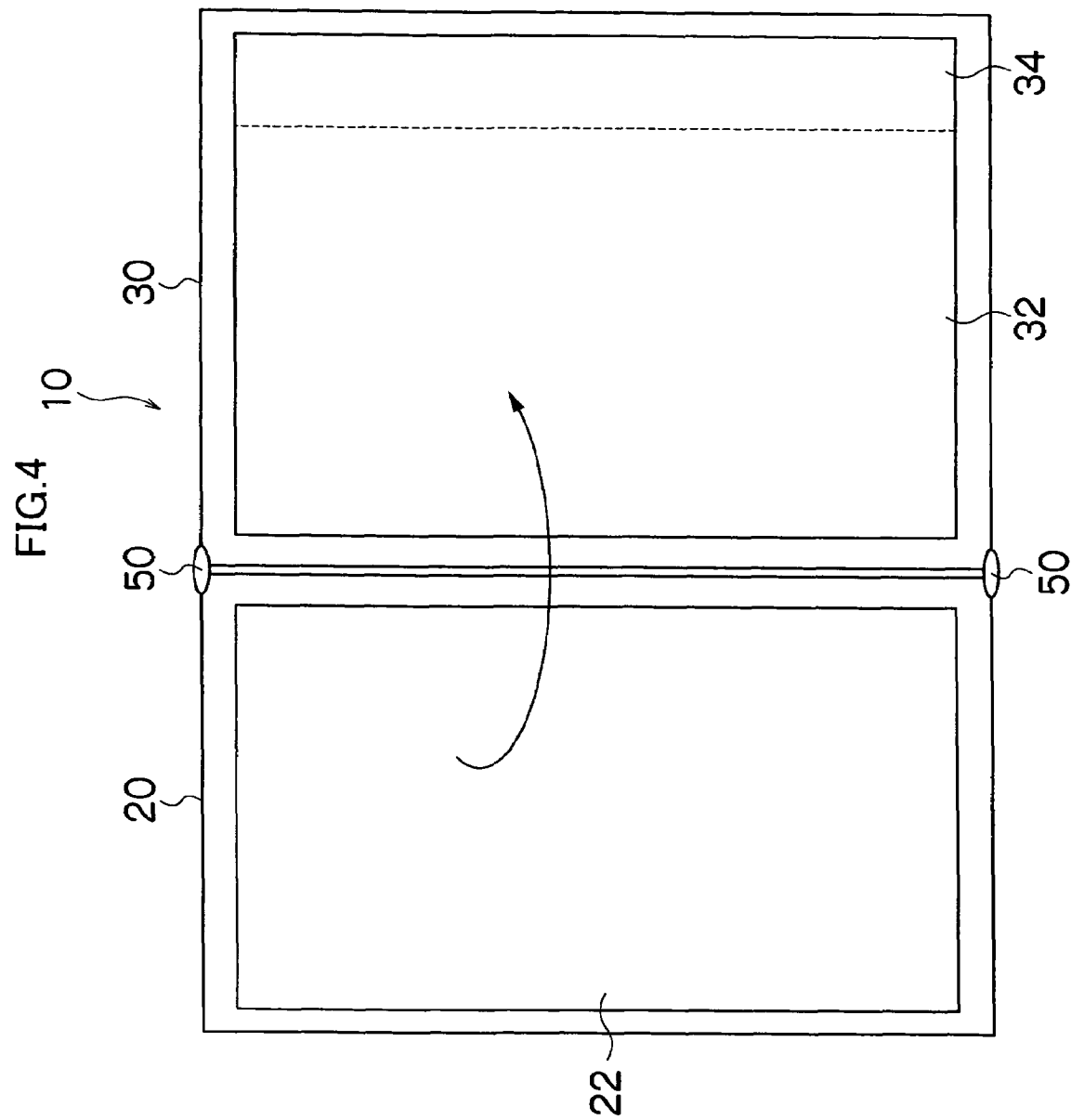
FIG. 4 is a diagram showing the electronic book in an open state, according to the embodiment of the present invention.

As shown in FIG. 3, when the electronic book 10 is folded, the first monitor unit 20 and the second monitor unit 30 do not overlap completely and part of the second monitor unit 30 is exposed (for a schematic view of the unfolded electronic book 10, see FIG. 4). The tactile index panel 34 is mounted on the exposed part. In this state, "A," "B," "C," . . . "Z" are visible.

To look up the phone number of "David," the user opens the electronic book 10 while pressing the index tab "D." Then, the axial sensor 52 senses that the electronic book 10 is opened while the index panel 34 and index panel control circuit 49 sense that the user pressed the index tab "D." Consequently, the phone numbers of people whose first names begin with "D" are extracted from the phone number data stored in the memory 46 and are displayed on the monitor 22 and monitor 32 (see FIG. 5).

Similarly, to look up the phone number of "Charles," the user opens the electronic book 10 while pressing the index tab "C." Then, the phone numbers of people whose first names begin with "C" are displayed (see FIG. 6).

In this way, the electronic book 10 according to the present embodiment displays index tabs on the index panel 34 when it is folded. By opening the electronic book 10 while pressing an index tab, the user can refer to necessary data quickly and easily.

Incidentally, by changing the display of the index panel 34, the electronic book 10 according to the present embodiment can be used as an address book, notebook with bookmark functions, etc. The electronic book 10 may also be used as an electronic album which displays images taken by digital cameras and the like.

In that case, shooting dates/times will be displayed as index tabs on the index panel 34 and when the user opens the electronic book 10 while pressing a desired index tab, images corresponding to the index tab will be displayed. The images may be displayed in full size or thumbnail size. When thumbnail images are displayed, the user can enlarge any of them to its full size by touching it. It is also possible to allow the user to touch that part of an image around which the user wants to enlarge the image.

If the electronic book 10 is used as an electronic album, Exif (Exchangeable Image File Format) data of images, annotation data about locations of photo shooting, or other data may be displayed as index tabs on the index panel 34 and when the user opens the electronic book 10 while pressing a desired index tab, images corresponding to the index tab may be displayed.

The electronic book 10 according to the present embodiment may have a touch-panel type display area installed on a part which corresponds to the cover or spine of a paper book. In that case, preferably, functions (e.g., Japanese Dictionary, English-Japanese Dictionary, Japanese-English Dictionary, Encyclopedia) of the electronic book 10 can be switched by operating the touch panel on the cover or spine.

For example, the user changes the display from "Japanese-English Dictionary" to "English-Japanese Dictionary" by operating an index tab displayed on the touch panel on the spine and the display on the index panel 34 changes from hiragana (Japanese cursive syllabary) to the alphabet accordingly. If the user wants to look up, for example, the meaning of "apple," the user opens the electronic book 10 while pressing the index tab "A." Then, the monitor 22 and monitor 32 display "Apple: Ringo." The electronic book 10 may be designed so as to display an image of an apple at the same time. incidentally, the electronic book 10 according to the present embodiment may display data using the monitor 22 and monitor 32 as a single display area or separate display areas.

Also, the electronic book 10 according to the present embodiment may employ liquid crystal monitors or a device such as so-called electronic paper as the monitor 22 and monitor 32.

Also, the electronic book 10 according to the present embodiment is not specifically limited in size and may be scaled to any desired size to suit the application. For example, the electronic book 10 may be approximately A4-size to secure a wide display area or approximately A6 odd size to secure portability. In so doing, the size of the monitor 22 and monitor 32 or the index panel 34 may be changed according to the size of the electronic book 10.

What is claimed is:

1. An electronic apparatus which is foldable, comprising:
   a recording unit which contains recorded data;
   a first equipment unit;
   a second equipment unit which does not cover the first equipment unit completely when the electronic apparatus is folded;
   a display unit which is installed on at least one of the first equipment unit and the second equipment unit and displays the recorded data;
   a folding unit which foldably couples the first equipment unit and the second equipment unit with the display unit facing inward;
   an index unit which is installed on an end of the first equipment unit or the second equipment unit, is exposed from the first equipment unit or the second equipment unit when the electronic apparatus is folded, and displays index tabs of the recorded data;
   a sensor device which senses an index tab specified by a user out of the displayed index tabs when the electronic apparatus remains folded;
   a extraction device which extracts data corresponding to the sensed index tab out of the recorded data; and a display device which displays the extracted data on the display unit when the electronic apparatus is unfolded, wherein the index unit has a tactile sensing function which allows the user to specify any of displayed index tabs by touching the given index tab, wherein the extraction device extracts the data in response to the tactile sensing function sensing a touch of a user.

2. An electronic apparatus, comprising:

a recording unit which contains recorded data;

a first display unit which displays the recorded data;

a second display unit which displays the recorded data and is larger than the first display unit; and a folding unit which foldably couples the first display unit and the second display unit with the display unit facing inward;

an index unit which is installed on an end of the second display unit and is exposed from the first display unit when the electronic apparatus is folded, and displays index tabs of the recorded data;

a sensor device which senses an index tab specified by a user out of the displayed index tabs when the electronic apparatus remains folded;

a extraction device which extracts data corresponding to the sensed index tab out of the recorded data; and a display device which displays the extracted data on the first and the second display unit when the electronic apparatus is unfolded, wherein the index unit has a tactile sensing function which allows the user to specify any of displayed index tabs by touching the given index tab, wherein the extraction device extracts the data in response to the tactile sensing function sensing a touch of a user.

3. The electronic apparatus according to claim 1, further comprising a fold sensor which detects a folded position and an unfolded position of the first equipment unit and the second equipment unit, wherein the extraction device extracts the data corresponding to the sensed index tab in response to the unfolded position being detected.

4. The electronic apparatus according to claim 2, further comprising a fold sensor which detects a folded position and an unfolded position of the first display unit and the second display unit, wherein the extraction device extracts the data corresponding to the sensed index tab in response to the unfolded position being detected.

\* \* \* \* \*